United States Patent
Nakamura et al.

(10) Patent No.: US 10,692,627 B2
(45) Date of Patent: Jun. 23, 2020

(54) ELECTRICAL CONDUCTION PATH

(71) Applicant: Sumitomo Wiring Systems, Ltd., Yokkaichi, Mie (JP)

(72) Inventors: Masaharu Nakamura, Mie (JP); Hironobu Yamamoto, Mie (JP); Toshinari Kobayashi, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 16/340,807

(22) PCT Filed: Oct. 4, 2017

(86) PCT No.: PCT/JP2017/036091
§ 371 (c)(1),
(2) Date: Apr. 10, 2019

(87) PCT Pub. No.: WO2018/070315
PCT Pub. Date: Apr. 19, 2018

(65) Prior Publication Data
US 2019/0267157 A1    Aug. 29, 2019

(30) Foreign Application Priority Data

Oct. 12, 2016  (JP) .................................. 2016-200703

(51) Int. Cl.
*B60R 16/02*       (2006.01)
*H02G 15/08*       (2006.01)
(Continued)

(52) U.S. Cl.
CPC ............. *H01B 7/184* (2013.01); *B60R 16/02* (2013.01); *B60R 16/0215* (2013.01); *H02G 1/145* (2013.01); *H02G 15/08* (2013.01)

(58) Field of Classification Search
CPC ...... H01B 7/184; H01B 7/00; B60R 16/0215; B60R 16/02; H02G 1/145; H02G 15/08; H02G 1/14
(Continued)

(56) References Cited

U.S. PATENT DOCUMENTS 2,452,823 A * 11/1948 Wright .................. H02G 15/18
174/88 R
4,207,429 A *  6/1980 Ward ..................... H02G 15/18
156/49
(Continued)

FOREIGN PATENT DOCUMENTS

| JP | S51-030988 A | 3/1976 |
| JP | H8-287999 A | 11/1996 |
| JP | 2009099356 A | 5/2009 |

OTHER PUBLICATIONS

Aircraft wiring and bonding AC21-99 (1) Australian Government Civil Aviation Safety Authority Section 2 Chapter 5 (Year: 2013).*
(Continued)

*Primary Examiner* — Timothy J Thompson
*Assistant Examiner* — Michael F McAllister
(74) *Attorney, Agent, or Firm* — Honigman LLP

(57) ABSTRACT

An electrical conduction path includes a main cable that has a multi-core cable obtained by enveloping a plurality of electric wires together with a sheath, and a plurality of branch cables obtained by dividing the electric wires of the multi-core cable into a plurality of parts, wherein connection portions are provided, in each of which an electric wire of the multi-core cable and an electric wire of a branch cable are electrically connected to each other. According to this configuration, it is possible to reduce the length of the expensive multi-core cable compared to a case where the electric wires of a multi-core cable are used over the entire
(Continued)

length of a cable including the branch cables, thus achieving cost reduction.

1 Claim, 3 Drawing Sheets

(51) Int. Cl.
    *H01B 7/18*     (2006.01)
    *H02G 1/14*     (2006.01)

(58) Field of Classification Search
    USPC ........................................................ 174/113 R
    See application file for complete search history.

(56) References Cited

U.S. PATENT DOCUMENTS

| | | | |
|---|---|---|---|
| 4,891,012 A * | 1/1990 | Pajot | B60R 16/0215 |
| | | | 174/72 A |
| 5,403,977 A * | 4/1995 | Steptoe | H01R 4/70 |
| | | | 156/49 |
| 5,755,588 A * | 5/1998 | Sweatman | H01R 13/6392 |
| | | | 439/369 |
| 6,171,132 B1 * | 1/2001 | Schmidt | F16L 57/00 |
| | | | 439/367 |
| 8,367,931 B2 * | 2/2013 | Emerson | H01R 4/183 |
| | | | 174/84 C |
| 8,653,365 B1 * | 2/2014 | Mixon | B60P 3/228 |
| | | | 174/71 R |
| 9,548,603 B2 * | 1/2017 | Loveless | G02B 6/4471 |
| 10,247,899 B2 * | 4/2019 | Islam | G02B 6/4416 |
| 2002/0019165 A1 * | 2/2002 | Aoki | B60R 16/0207 |
| | | | 439/502 |
| 2016/0268019 A1 * | 9/2016 | Kanagawa | H02G 3/0468 |
| 2017/0338641 A1 | 11/2017 | Komori et al. | |

OTHER PUBLICATIONS

International Search Report, Application No. PCT/JP2017/036091, dated Nov. 21, 2017. ISA/Japan Patent Office.

* cited by examiner

ELECTRICAL CONDUCTION PATH

CROSS-REFERENCE TO RELATED APPLICATIONS

This application is the U.S. national stage of PCT/JP2017/036091 filed Oct. 4, 2017, which claims priority of Japanese Patent Application No. JP 2016-200703 filed Oct. 12, 2016, the contents of which are incorporated herein.

TECHNICAL FIELD

The present disclosure relates to an electrical conduction path.

BACKGROUND

Conventionally, electrical conduction paths are known that are provided with a main cable, and branch cables into which the main cable is divided. For example, JP 2016-123224A discloses an electrical conduction path that is made of a multi-core cable obtained by enveloping a plurality of electric wires together with a sheath, in which the electric wires that are lead out from an end of the sheath are divided into two branches.

However, in a configuration as described above, when branch cables have different lengths, the length of a multi-core cable is ensured such that it corresponds to the length of the longer branch cable, and the electric wires of the multi-core cable in the shorter branch cable are cut off. Because a multi-core cable is expensive, improvement in view of cost reduction is in demand.

The present disclosure was made in view of the aforementioned problem, and it is an object thereof to provide an electrical conduction path whose cost can be reduced.

SUMMARY

According to the present disclosure, an electrical conduction path includes: a main cable that has a multi-core cable obtained by enveloping a plurality of electric wires together with a sheath; and a plurality of branch cables obtained by dividing the electric wires of the multi-core cable into a plurality of parts, wherein connection portions are provided, in each of which an electric wire of the multi-core cable and an electric wire of a branch cable are electrically connected to each other, the electric wires of the branch cable being connected only to some of the plurality of electric wires of the multi-core cable.

Advantageous Effects of Disclosure

According to the present disclosure, it is possible to reduce the length of an expensive multi-core cable compared to a case where a multi-core cable is used over the entire length of a cable including the branch cables, thus achieving cost reduction.

DETAILED DESCRIPTION OF PREFERRED EMBODIMENTS

Hereinafter, preferred embodiments of the present disclosure will be described.

The electrical conduction path of the present disclosure may further include a protection member that covers the circumference of the connection portion. According to this configuration, it is possible to protect the connection portion between an electric wire of the multi-core cable and an electric wire of a branch cable.

Furthermore, the electrical conduction path of the present disclosure may have a configuration in which the protection member is a resin molded body molded to cover the connection portion. According to this configuration, the connection portion between electric wires is sealed by the resin molded body in a liquid-tight manner, and thus it is possible to make the connection portion water-tight.

Furthermore, the electrical conduction path of the present disclosure may have a configuration in which adjacent connection portions of the plurality of connection portions are provided shifted from each other in a direction in which the electric wires extend. According to this configuration, the connection portions can be prevented from coming into contact with each other due to molding pressure exerted when the resin molded body is molded, and thus it is possible to reduce the cost compared to a case where, for example, a member for preventing the connection portions from coming into contact with each other is additionally used.

Embodiment 1

Figure 1:
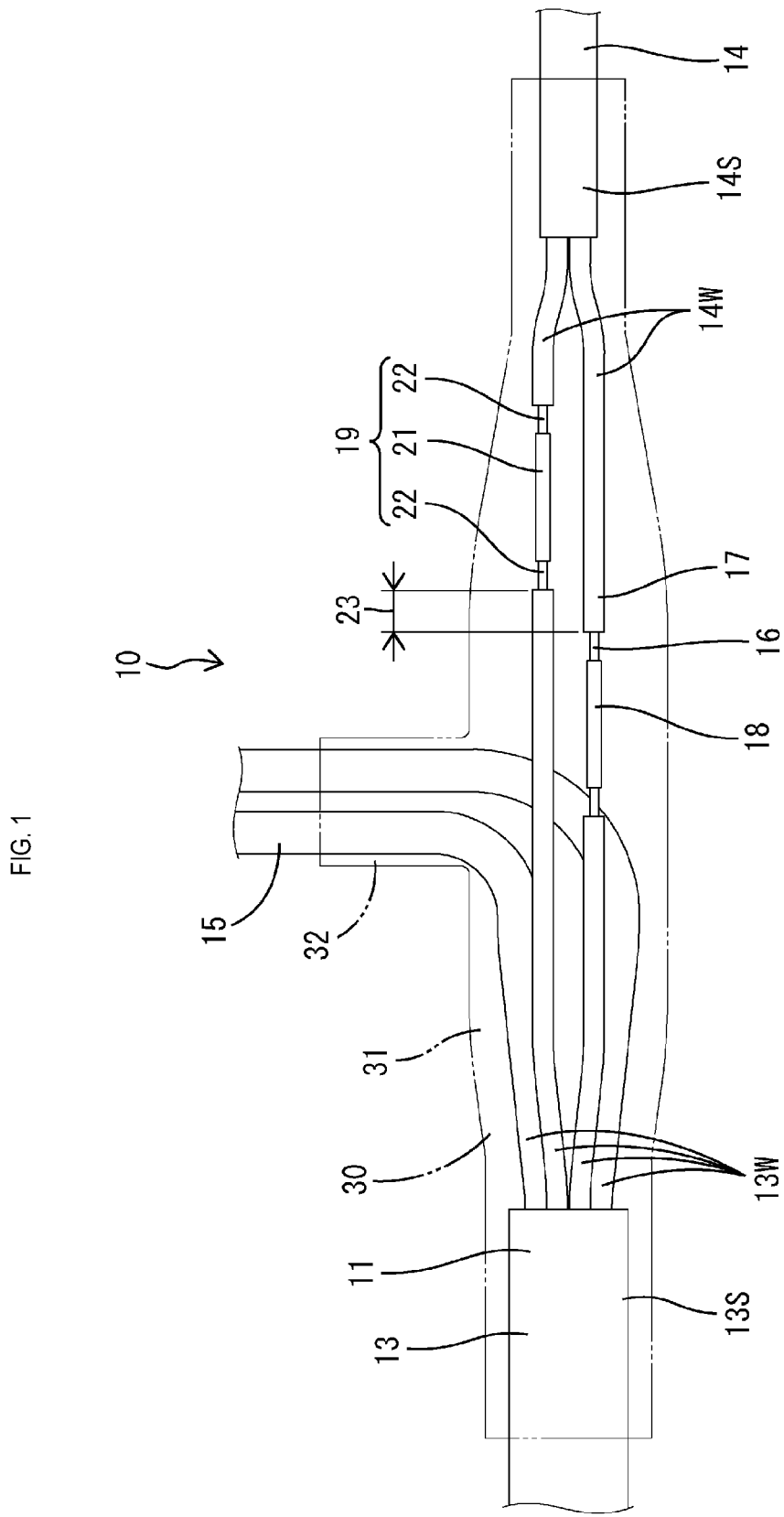
FIG. 1 is a side view illustrating an electrical conduction path according to Embodiment 1.

Hereinafter, Embodiment 1 of the present disclosure will be described in detail with reference to FIG. 1.

An electrical conduction path 10 according to the present embodiment is a composite cable in which two or more types of cables (in the present embodiment, a first cable and a second cable) are merged together, and that is installed in a vehicle such as an automobile. In the present embodiment, the first cable is a cable for an Antilock Brake System (ABS) that is designed to be provided with, at a terminal portion thereof, a not-shown ABS sensor, and is used as a signal line for transmitting a signal detected by the ABS sensor. The second cable is a cable for an Electric Parking Brake (EPB) system, and is used as an electrical conduction path through which a current is caused to flow to activate an EPB mechanism. A terminal portion of the second cable is electrically connected to the EPB mechanism via, for example, a connector.

The electrical conduction path 10 includes a main cable 11 that has a multi-core cable (four-core cable in the present embodiment) 13 obtained by enveloping a plurality of electric wires 13W together with a sheath 13S, and a plurality of (two in the present embodiment) branch cables (a first branch cable 14 and a second branch cable 15 in the present embodiment) obtained by dividing the electric wires 13W of the multi-core cable 13 into a plurality of branches (two branches in the present embodiment).

The first branch cable 14 extends straight from the main cable 11, and the second branch cable 15 is bent in a direction substantially perpendicular to the main cable 11. The first branch cable 14 is longer than the second branch cable 15. Note that the first branch cable 14 is the first cable, and the second branch cable 15 is the second cable. The second branch cable 15 is constituted by two electric wires 13W extending from the sheath 13S of the multi-core cable 13.

The first branch cable 14 includes a plurality of connection portions 18, in each of which an electric wire 13W of the multi-core cable 13 and an electric wire 14W of the first branch cable 14 are electrically connected to each other. The first branch cable 14 is constituted by the electric wires of a multi-core cable (two-core cable in the present embodiment) in which a plurality of (two in the present embodiment) electric wires 14W are embedded together in a sheath 14S made of a synthetic resin. Note that the electric wires 13W and the electric wires 14W are each formed by enveloping a conductor 16 with an insulating covering 17.

The electric wires 14W of the first branch cable 14 are electrically connected to the electric wires 13W of the multi-core cable 13 in a branching portion of the electrical conduction path 10. The electric wires 13W of the multi-core cable 13 and the electric wires 14W of the first branch cable 14 are connected to each other such that the conductors 16 exposed from the insulating coverings 17 at the terminal portions of the electric wires 13W and 14W are connected and coupled to each other through soldering or the like.

The connection portions 18 between the electric wires 13W of the multi-core cable 13 and the electric wires 14W of the first branch cable 14 are provided shifted from each other in a direction in which the electric wires 13W and 14W extend. Specifically, conductor-exposed portions 19, at which the conductors 16 are exposed, of the respective connection portions 18 between the electric wires 13W of the multi-core cable 13 and the electric wires 14W of the first branch cable 14 are provided shifted from each other in the direction in which the electric wires 13W and 14W extend. Each conductor-exposed portion 19 includes a contact portion 21 in which the conductors 16 are in contact with each other via solder or the like, and extension portions 22 that extend, to the contact portion 21, from the respective end faces of the insulating coverings 17 of the electric wires 13W and 14W. Due to the conductor-exposed portions 19 being shifted from each other by their entire length with respect to two adjacent electric wires 13W, 14W, an insulating portion 23 constituted by the insulating coverings 17 is formed between the conductor-exposed portions 19.

The electrical conduction path 10 is provided with a protection member (resin molded body 30 in the present embodiment) that covers the circumference of the connection portions 18. The resin molded body 30 covers the branching portion between the main cable 11 and the branch cables 14 and 15.

The resin molded body 30 covers the portion of the electric wires 13W and 14W that are exposed from the outer coverings (the sheaths 13S and 14S). The resin molded body 30 is integrated, through molding, with the exposed portions of the electric wires 13W and 14W, and the ends of the outer coverings that abut against the exposed portions of the electric wires 13W and 14W.

The resin molded body 30 includes a first covering portion 31 that covers the portion spanning between the end of the main cable 11 and the end of the first branch cable 14, and a second covering portion 32 that covers an end of the second branch cable 15. The second covering portion 32 protrudes from an intermediate portion, in the length direction, of the first covering portion 31 in a direction substantially perpendicular thereto.

The following will describe an example of a method for manufacturing the electrical conduction path 10 of the present embodiment.

First, a cable is manufactured that has a shape such that the main cable 11 is branched into the first branch cable 14 and the second branch cable 15. The multi-core cable 13, which constitutes the main cable 11, is cut into a predetermined length (the length that covers the second branch cable 15), and two electric wires 14W of the two-core cable are respectively connected to two electric wires 13W that extend from an end of the sheath 13S, so that the first branch cable 14 is formed.

Then, molding is performed to obtain the resin molded body 30. The branching portion of the electric wires 13W and 14W is set in a not-shown metal mold, and a molten resin is poured into the metal mold. The poured molten resin flows between the electric wires 13W, 14W and fills the cavity. At this time, there may be a case where the electric wires 13W, 14W pushed by the flowing resin are brought into contact with each other. Here, if the conductor-exposed portions 19 are brought into contact with each other, the electric wires 13W and 14W will short, but in the present embodiment, even if the electric wires 13W, 14W come into contact with each other, the conductor-exposed portion 19 of each connection portion 18 will come into contact with the insulating covering 17 of another electric wire 13W or 14W, and thus it is possible to prevent the conductor-exposed portions 19 from coming into contact with each other and shorting. Then, by cooling and solidifying the resin, the resin molded body 30 is molded to a predetermined shape, and is integrated with the exposed portions of the electric wires and the ends of the outer coverings while being in intimate contact therewith.

The following will describe functions and effects of the embodiment having the above-described configuration.

The electrical conduction path 10 of the present embodiment includes the main cable 11 that has the multi-core cable 13 obtained by enveloping a plurality of electric wires 13W together with the sheath 13S, and the first branch cable 14 and the second branch cable 15 that are obtained by dividing the electric wires 13W of the main cable 11 into a plurality of parts, in which the plurality of connection portions 18 are provided, in each of which an electric wire 13W of the multi-core cable 13 and an electric wire 14W of the first branch cable 14 are electrically connected to each other. According to this configuration, it is possible to reduce the length of the expensive multi-core cable compared to a case where a multi-core cable 13 is used over the entire length of a cable including the first branch cable 14, thus achieving cost reduction.

Furthermore, the circumference of the connection portions 18 is covered with the resin molded body 30, which was subjected to molding. According to this configuration, it is possible to protect the connection portions 18 between the electric wires 13W of the multi-core cable 13 and the electric wires 14W of the first branch cable 14. Furthermore, the connection portions 18 between the electric wires 13W and 14W are sealed by the resin molded body 30 in a liquid-tight manner, and thus it is possible to make the connection portions 18 water-tight.

Furthermore, the plurality of connection portions 18 are provided shifted from each other in the direction in which the electric wires 13W and 14W extend. According to this configuration, even if the electric wires 13W, 14W are brought into contact with each other due to molding pressure exerted when the resin molded body 30 is molded, the conductor-exposed portions 19 of the connection portions 18 will be prevented from coming into contact with each other, and thus it is possible to reduce the cost compared to a case where, for example, a member for preventing the conductor-exposed portions 19 from coming into contact with each other is additionally used.

Reference Example

Figure 2:
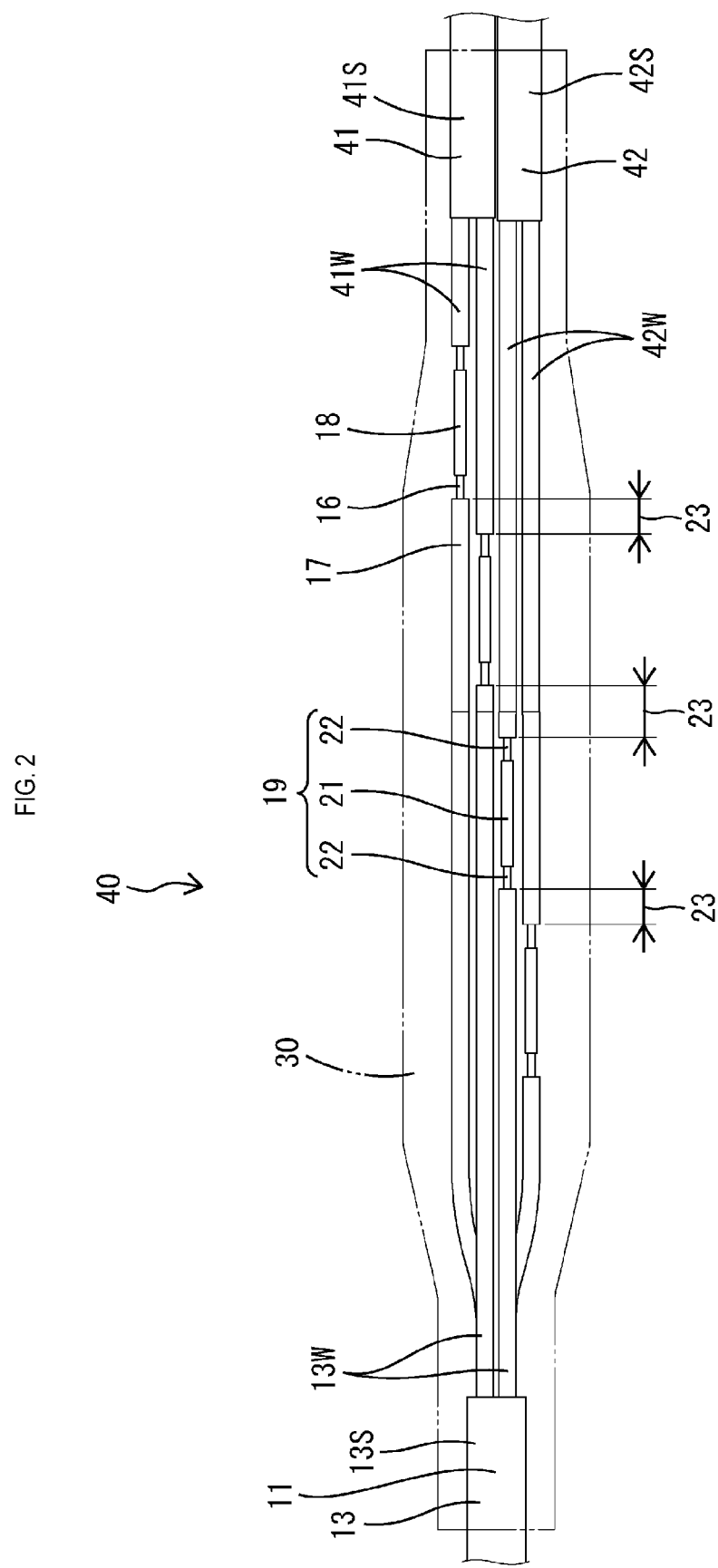
FIG. 2 is a side view illustrating an electrical conduction path according to a reference example.

Hereinafter, an electrical conduction path 40 according to a reference example of the present disclosure will be described with reference to FIG. 2.

The electrical conduction path 40 of the present reference example differs from the electrical conduction path of Embodiment 1 in that both branch cables 41 and 42 are straight, and all electric wires 41W and 42W of the branch cables 41 and 42 are electrically connected to the electric wires 13W of the multi-core cable 13, respectively. Note that the same reference numerals are given to the same configurations of Embodiment 1, and redundant descriptions are omitted.

Similar to Embodiment 1, the electrical conduction path 40 of the present reference example is provided with the main cable 11, and the first branch cable 41 and the second branch cable 42 into which the main cable 11 is divided, the main cable 11 including the multi-core cable 13 that is obtained by enveloping a plurality of electric wires 13W together with the sheath 13S.

Both the first branch cable 41 and the second branch cable 42 extend from the main cable 11, and respectively include the electric wires 41W and 42W that are connected to the electric wires 13W of the main cable 11. The first branch cable 41 and the second branch cable 42 are each made of a two-core cable in which two electric wires 41W, 42W are embedded together in corresponding sheathes 41S, 42S, which are made of a synthetic resin. The electric wires 41W and 42W of the first branch cable 41 and the second branch cable 42 are electrically connected to the electric wires 13W extending from an end face of the sheath 13S of the multi-core cable 13.

Similar to Embodiment 1, conductor-exposed portions 19, in which the conductors 16 are exposed, of the respective connection portions 18 between the electric wires 13W of the multi-core cable 13 and the electric wires 41W, 42W of the branch cables 41, 42 are provided shifted from each other in the direction in which the electric wires 13W, 41W, and 42W extend. The conductor-exposed portions 19 of all of the electric wires 13W, 41W, and 42W are provided shifted one by one from one end side to the other end side in one direction in which the electric wires 13W, 41W, and 42W extend. Similar to Embodiment 1, an insulating portion 23 constituted by the insulating coverings 17 is formed between the conductor-exposed portions 19 shifted one by one in one direction.

As described above, in the present reference example, similar to Embodiment 1, the branch cables 41 and 42 respectively include the electric wires 41W and 42W that are connected to the electric wires 13W of the multi-core cable 13, and thus it is possible to reduce the length of the expensive multi-core cable 13 compared to a case where the electric wires 13W of a multi-core cable 13 are used over the entire length of a cable including the branch cables 41 and 42, thus achieving cost reduction. Furthermore, similar to Embodiment 1, the conductor-exposed portions 19, in which the conductors 16 are exposed, of the respective connection portions 18 are provided shifted from each other in the direction in which the electric wires 13W, 41W, and 42W extend, and are arranged along the insulating coverings 17 of the electric wires 13W, 41W, and 42W, and thus even if the electric wires 13W, 41W, and 42W are brought into contact with each other due to the molding pressure exerted when the resin molded body 30 is molded, it is possible to prevent the conductor-exposed portions 19 of the connection portions 18 from coming into contact with each other.

Other Embodiments

The present disclosure is not limited to the embodiments explained with reference to the above description and the drawings, and the technical scope of the present disclosure encompasses, for example, the following embodiments.

Figure 3:
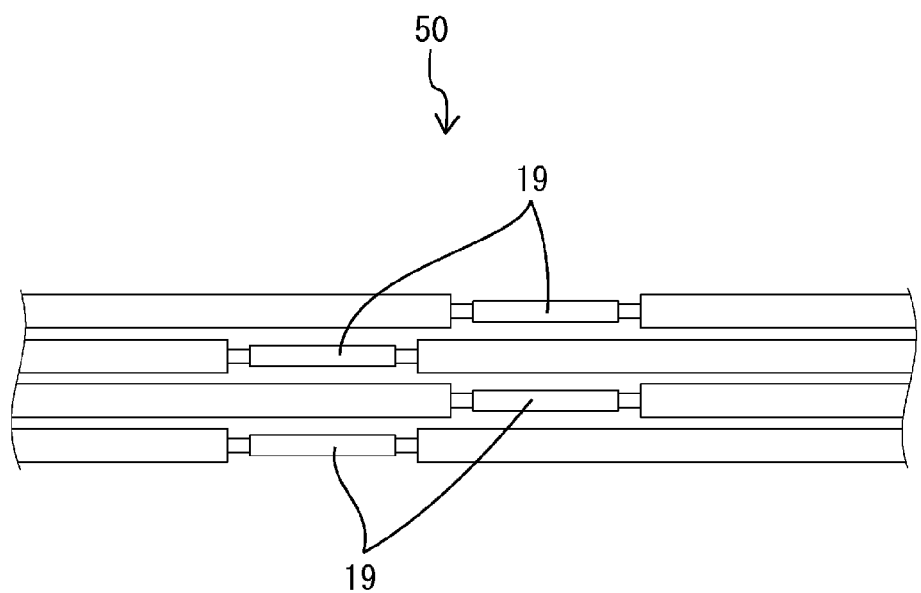
FIG. 3 is a side view illustrating an electrical conduction path according to another embodiment.

In the above-described embodiments, the conductor-exposed portions 19 of all of the electric wires 13W, 14W (41W and 42W) of the electrical conduction path 10 (40) are provided at positions shifted from each other in a direction in which the electric wires 13W and 14W (41W and 42W) extend, but the present disclosure is not limited to this, and the positions of the conductor-exposed portions 19 may also be shifted from each other only between adjacent electric wires as shown in FIG. 3 for example, that is to say, the present disclosure may also relate to an electrical conduction path 50 in which the positions of the conductor-exposed portions 19 are alternately shifted from each other in the direction in which the plurality of electric wires are lined up.

In the above-described embodiments, the resin molded body 30 is a protection member, but the present disclosure is not limited to this, and a rubber member with a plurality of wire insertion holes may also be provided as a protection member.

In the above-described embodiments, the number of electric wires served as an example, but the number of electric wires may be changed as appropriate.

In the above-described embodiments, a case where the electrical conduction path 10 (40) is a composite cable that is installed in a vehicle is taken as an example, but the present disclosure is not limited to this and may be applied to various types of cables.

In the above-described embodiments, the electrical conduction path 10 (40) is a two-branch cable in which the main cable 11 is divided into two branches, but the present disclosure is not limited to this, and the electrical conduction path 10 (40) may also be a multi-branch cable in which the main cable 11 is divided into three or more branches.

In the above-described embodiments, the electric wire 14W (41W) (42W) is connected to the electric wire 13W of the multi-core cable 13 in the branching portion of the electrical conduction path 10 (40), that is to say, in the vicinity of the starting point of the branch cable 14 (41) (42), but the present disclosure is not limited to this, and the electric wires may also be connected to each other at a position away from a mid-way position of the branch cable.

In the above-described embodiments, the electric wires 14W (41W) (42W) of the branch cable 14 (41) (42) are constituted by the electric wires of a multi-core cable, but the present disclosure is not limited to this, and the electric wires of the branch cable may also be electric wires that are separate from each other without being embedded together in a sheath.

The invention claimed is:

1. An electrical conduction path comprising:
   a main cable that has a multi-core cable obtained by enveloping a plurality of electric wires together with a sheath; and
   a plurality of branch cables each sheathed in an insulating covering, the plurality of branch cables obtained by dividing the electric wires of the multi-core cable into a plurality of parts, wherein connection portions are provided, in each of which an electric wire of the multi-core cable and an electric wire of a branch cable are electrically connected to each other, the electric wires of the branch cable being connected only to some of the plurality of electric wires of the multi-core cable;

wherein adjacent connection portions of the plurality of connection portions are provided shifted from each other in a direction in which the electric wires extend so as to position each of the connection portions parallel to the insulating cover of a respective one of the plurality of branch cables; and a protection member that covers circumference of the plurality of branch cables and the main cable so as to cover an entire circumference of the connection portions and the main cable, wherein the protection member is a resin molded body molded to cover the connection portions.

* * * * *